United States Patent [19]

Weed et al.

[11] 3,867,582

[45] Feb. 18, 1975

[54] REMOTE CONTROL FOR PRIVATE AUTOMATIC BRANCH TELEPHONE EXCHANGE

[75] Inventors: Robert P. Weed, Prairie Village; Gary Rosenberg; Quentin Bourkland, both of Overland Park, all of Kans.; Robert E. Overby, Harrisonville, Mo.

[73] Assignee: United Business Communications, Inc., Shawnee Mission, Kans.

[22] Filed: June 12, 1973

[21] Appl. No.: 369,405

[52] U.S. Cl. .......... 179/18 BE

[51] Int. Cl. .......... H04m 3/54

[58] Field of Search .......... 179/18 BE, 2 DP

[56] References Cited

UNITED STATES PATENTS

| | | | |
|---|---|---|---|
| 3,381,276 | 4/1968 | James | 179/2 DP |
| 3,689,702 | 9/1972 | McCay | 179/18 BE |

*Primary Examiner*—William C. Cooper
*Attorney, Agent, or Firm*—Lowe, Kokjer, Kircher, Wharton & Bowman

[57] ABSTRACT

The remote control arrangement permits switched audio access to the existing interoffice facilities of a customer owned private automatic branch exchange (PABX), for example, WATS trunks, Foreign Exchange (FX) trunks, and tie lines as well as various intra-office facilities that may exist such as dialed dictation, voice answering and recording, voice paging and other miscellaneous internal services that may be available within the existing PABX. A switched connection from any remote telephone station may be established to any switchable route within the PABX by dialing a specified seven digit code. The seven digit code establishes the connection to the PABX switching system over one of the existing PABX local exchange trunks. Next, an enable code is keyed from the telephone set and transmitted to a receiver decoder and translator attached to the switching machine. In response thereto, the switching machine generates output signals which are applied to the translator and if a valid enable code has been keyed, the machine will switch the connection and submit a dial tone connection to the telephone set, following which any code that presently exists within the PABX communication system can be dialed, thus obtaining access to that particular inter-office or intra-office facility.

5 Claims, 3 Drawing Figures

REMOTE CONTROL FOR PRIVATE AUTOMATIC BRANCH TELEPHONE EXCHANGE

BACKGROUND AND SUMMARY OF THE INVENTION

The demand to utilize the various functions of a PABX communications system from remote locations during working or non-working hours has increased proportionally with the implementation of modern features and service arrangements within the PABX communications system. Most modern PABX's of today typically have one or more inter-office facilities such as WATS trunks, FX trunks, tie lines and dialup private network facilities. Inter-office facilities such as WATS trunks and tie lines are subscribed to by the business customer from the telephone company common carrier on a full time, flat rate basis. Such facilities have heretofore been available to the customer only during the daytime working hours, or only when the customer has access to a telephone that is connected directly to the PABX communication system. In order to permit the customer to have remote access to the PABX switching facilities, a PABX off-premise extension had to be subscribed to from the local telephone company and installed and connected at a fixed location (such as a residence) in order to permit access to the switched services of the PABX.

As indicated above, special facilities must be installed and subscribed to between the location of the PABX communications system and each remote user location in order to enable the user to utilize the PABX switching system. Such facilities are quite costly since a tariff charge is incurred by the subscriber for each off-premise extension communication link at each location; the resulting cost is sufficiently high to inhibit this type of arrangement for a plurality of user locations.

One of the principal objects of the present invention is to provide an arrangement whereby the remote user location costs are eliminated and permitting any number of user locations to gain access to the services that exist at the PABX switching system from their existing telephone instruments.

It is another object of the present invention to provide for an inexpensive remote control switching access to a PABX communications switching system, the primary purpose being to gain switched access to inter-office audio trunk facilities such as WATS or FX lines when equipped; or to access the local PABX exchange trunks to take advantage of the lower rates by eliminating operator-assisted third party billing or long distance credit card calls.

Another object of the present invention is to provide in particular for switched access from the user location by touch calling signals, permitting switched access to other types of audio services which may exist within the PABX system such as dictation recording, voice paging, telephone recording services and other miscellaneous audio services that may be available from which the customer can benefit by off-premise remote access.

Still another object of the present invention is to utilize the existing touch calling facilities that already exist within a PABX for utilization of the off-premise remote control.

In general the objectives of the invention are met by providing an arrangement wherein by proper signaling from any remote telephone set a connection can be made with the PABX over one of the existing PABX exchange trunks. Once the connection is established, a special "enable" code is keyed from the telephone set which is decoded and applied to a translator. If a valid code has been keyed, the connection will be switched and the PABX will submit a dial tone connection to the calling party. The PABX can then be employed by keying the set in the normal fashion to obtain access to any existing inter-office or intra-office facility.

Among the features of the invention, in addition to those noted above are the utilization of the keyed, in-band touch calling signal input information to be decoded to digital signals and translated into functions to control the switching; the utilization of existing telephone company provided voice connecting units that are already interfaced to the PABX for control of answer and disconnect supervision functions; the ability to change the enable code at the will of the PABX customer; the provision of means for metering the incoming call attempts and completions; and the provision of audio amplification after the switched entry to the PABX to correct for additional exchange trunk losses through switched connections.

Other objects and features of the invention appurtenant thereto will appear in the course of the following description.

DETAILED DESCRIPTION

Figure 1:
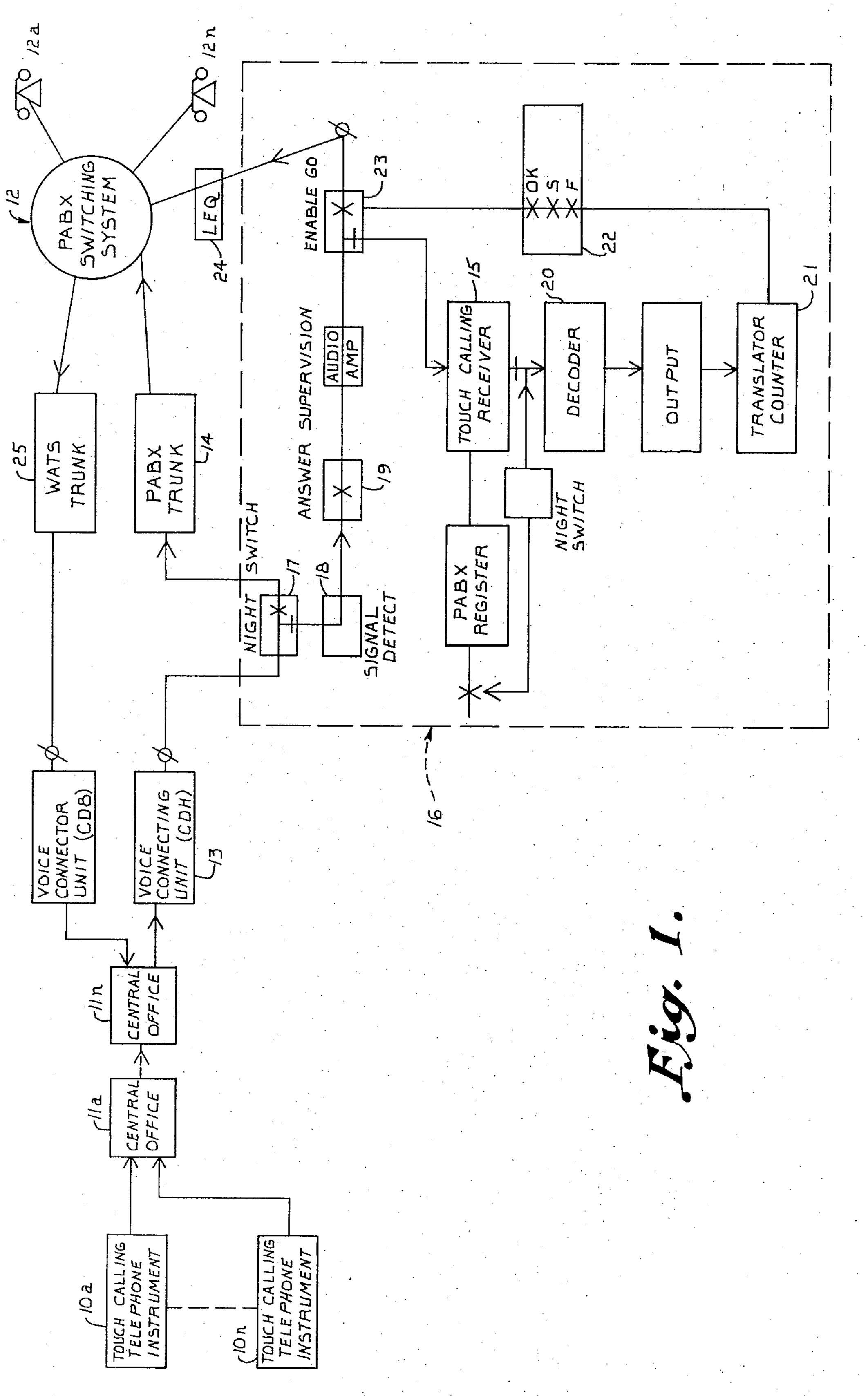
Figure 2:
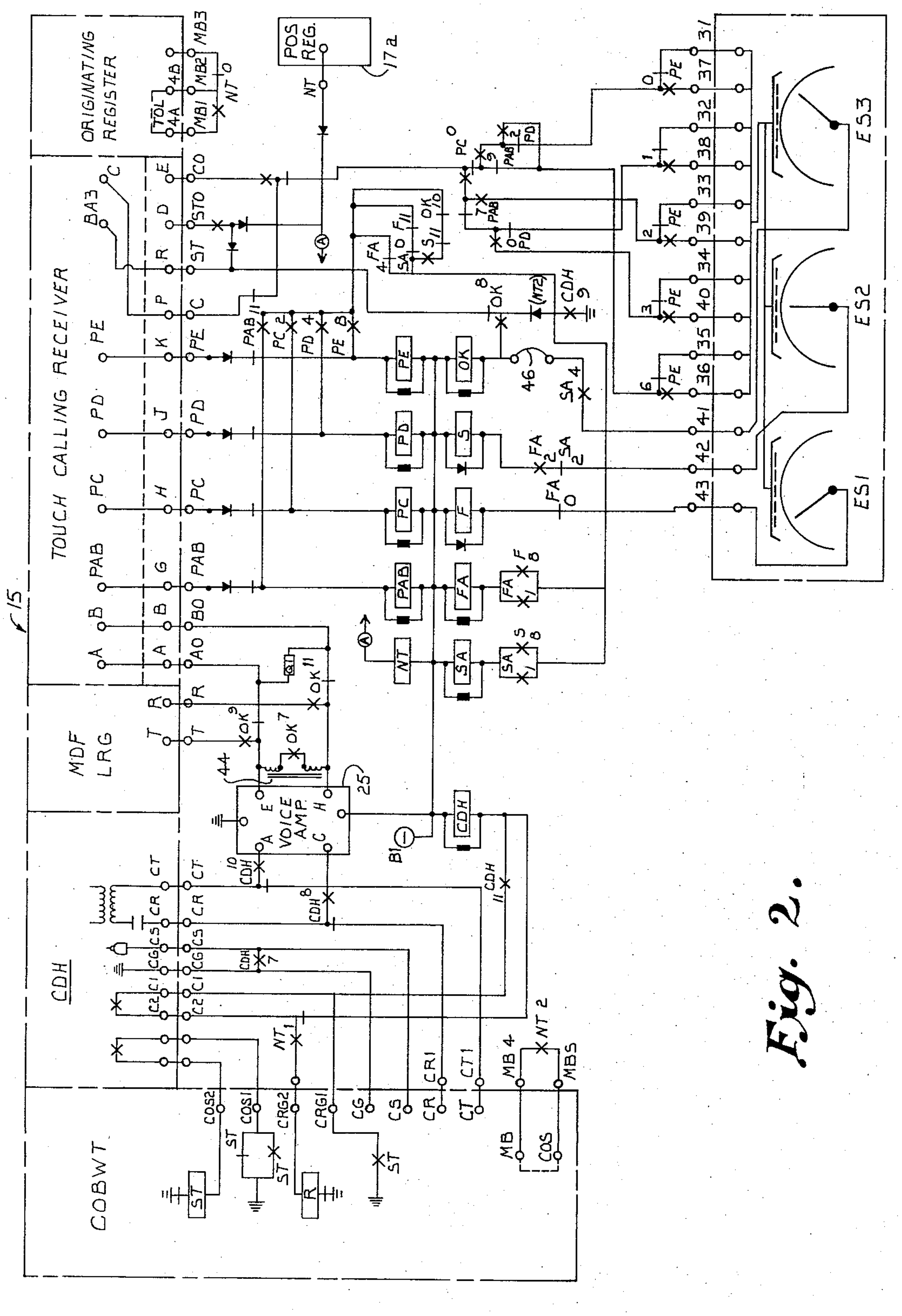
Figure 3:
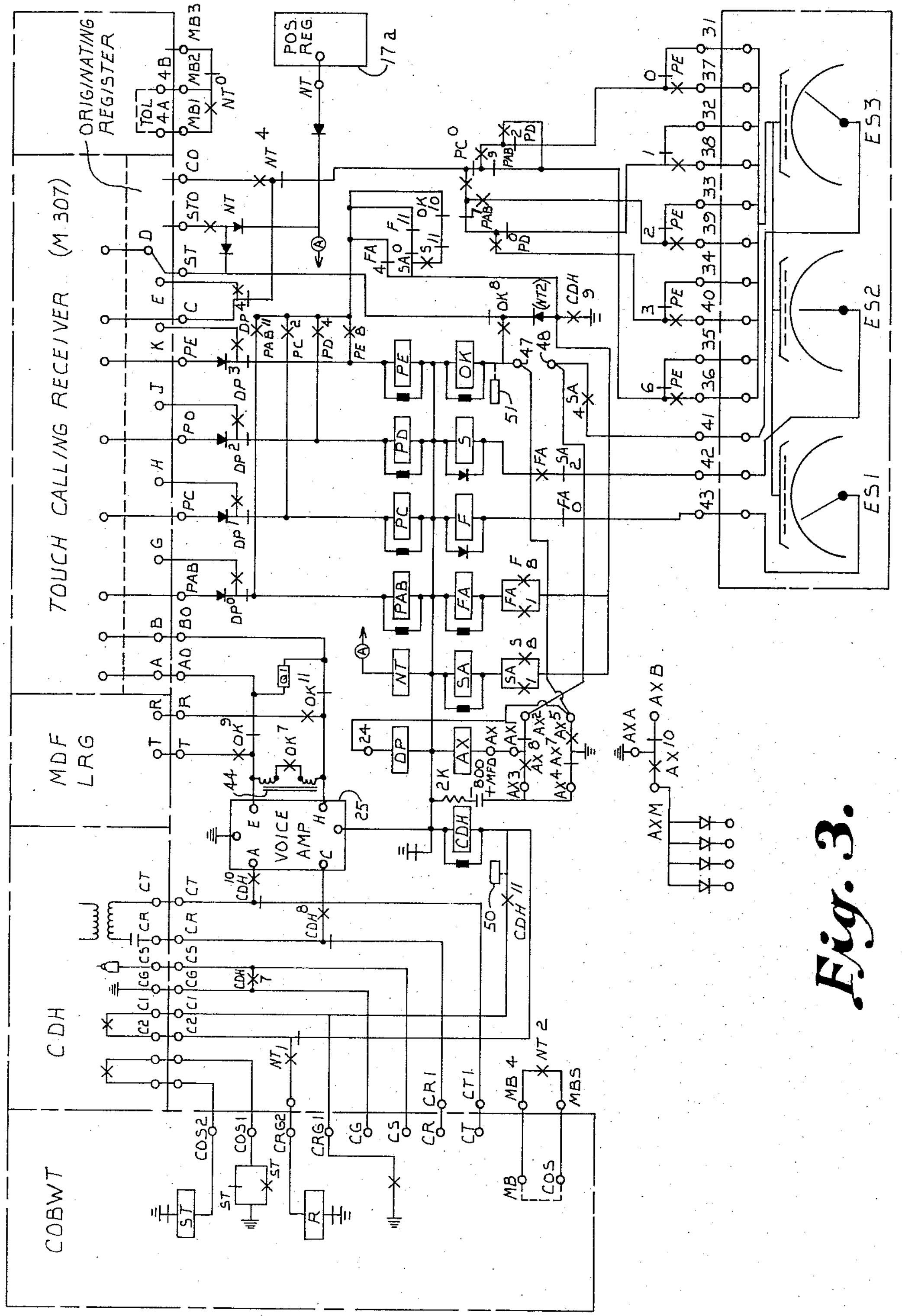

In the accompanying drawings, which form part of the specification and which are to be read in conjunction therewith, and in which like reference numerals indicate like parts in various views:

FIG. 1 is an illustrative embodiment of a remote access system made in accordance with the principles of the present invention; and FIG. 2 is a more detailed circuit schematic showing the system wired with a PABX equipped for touch calling; and FIG. 3 is a schematic showing the wiring for a dial pulse PABX.

Referring now to the drawings and initially to FIG. 1, a plurality of subscriber stations 10a,...10n is shown. The subscriber stations are standard, conventional station telephone instruments provided by the telephone company and capable of generating multifrequency signals, such as disclosed, for example, in Meacham et al. U.S. Pat. No. 3,184,554, issued May 18, 1965. Each is directly connected to the telephone company central office 11*a*. In order to establish a teminating connection to the customer PABX switching equipment, a plurality of central offices may be involved, 11*a* . . . 11*n*.

The central office serving the PABX equipped with the remote access circuitry disclosed herein, must be arranged for calling party release, either immediate or timed. Virtually all crossbar and ESS offices provide this feature. Many step-by-step offices, however, do not unless they have been modified.

The PABX 12, which in the preferred embodiment is equipped for touch calling, is interfaced with the telephone network through a voice connecting unit 13 of the CDH type, provided by the telephone company. Such a unit is an eight wire unit which includes a COS lead disconnect supervision function, the importance of which will subsequently be made clear. For two wire application the PABX central office trunk 14 must be a ground start loop dial type trunk. The PABX also must include a touch calling receiver 15, for example, a TEL-TONE M-307 or M-130, or equivalent. (TEL-TONE M-307, M-130 are model designations of touch calling receivers manufactured and sold by Tel-Tone Corporation, Kirkland, Wash.). If the PABX is already equipped with touch calling, one of the receivers presently equipped will be automatically switched to the remote access circuit, as will later be shown. If the PABX is not equipped with touch calling, an individual receiver will have to be acquired and connected into the system.

The remote access circuit with some of the associated PABX components is generally indicated by reference numeral 16, FIG. 1. Functionally it is interconnected with the PABX by means of an operator controlled night transfer switch 17 which in a preferred embodiment is a relay operated switch which at times the PABX is monitored (daytime) is operated and at night is dropped out. Switching conditions illustrated in FIGS. 1 and 2 with respect to the night transfer switch contacts are shown in the night time, or relay unoperated, condition for the night transfer switch relay.

When the night transfer switch relay is dropped out, incoming access from the remote stations 10*a*–10*n* is switched from trunk 14 to a signal detect circuit 18. Once a ringing signal has been detected at 18, immediate answer supervision is sent back by the answer supervisory circuit 19. The call is then switched to the touch calling receiver 15.

The next step in the sequence is the keying at the now connected calling station at 10*a* . . . 10*n* of a preassigned three digit code which serves the function of enabling a connection of the calling station with the PABX switching circuits. The touch calling receiver 15 detects the in-band touch calling frequencies resulting from the keying of the calling station, and they are decoded by a decoder circuit 20 which generates a binary output which is sent to a translator-counter 21 which applies the code to an enable circuit 22.

If the first digit is valid, i.e., conforms to the first digit of the preassigned code, the enable circuit 22 accepts it and switches its mode to receive the second digit. If the second digit is valid, the enable circuit switches its mode to receive the third digit, and if the latter is valid, the call is switched by the enable-go control circuit 23 to line equipment 24 which creates a call into the PABX switching system in the same manner as if the call had originated at a PABX location 12*a* . . . 12*n*. PABX dial tone is sent to the calling station and the normal functions for which the PABX is equipped can now be carried out as if the remote calling station was in fact one of the intra-office stations 12*a* . . . 12*n* at the PABX.

For example, if a WATS line is desired, the assigned switching digit for WATS (e.g., "8") is keyed. The resulting in-band frequency is received and decoded by the PABX which switches the connection 24 to an idle WATS trunk 25. After central office dial tone is received from the WATS trunk at the calling station 10*a* . . . 10*n* the user may key the called number (toll access code "1" plus 10 digits) which is received by the telephone company central office, thereby permitting processing of the call in the same manner as if the call had originated from the PABX switching system.

The same procedure is followed with respect to obtaining access through the PABX to other facilities, such as dictation recording, voice paging, intra-office stations and the like. Once the user has correctly keyed the access code, the calling station is connected into the PABX switching system and it can be used in the same manner as if access was by an intra-office station.

In the circuit schematic, FIG. 2., circuitry for the preferred embodiment in a PABX equipped for touch calling, is illustrated. The schematic also shows unconnected circuit components used in adapting the invention to a dial pulse PABX. The wiring for the latter is illustrated in FIG. 3 and will be described at a later point herein.

Referring to FIG. 2., in daytime operation, the NT relay, which is the night transfer switch relay, is operated. At night time, when the attendant operates the PABX night key at 17*a*, the ground on the NT terminal is removed and if the originating register is idle, the NT relay is permitted to release.

When an incoming call arrives over the CDH trunk line, COS 1 and COS 2 leads close within the CDH unit, which operates the ST relay which locks over the COS leads and remains operative throughout the entire call. The first incoming ring signal is indicated by a closure between leads C1 and C2 within the interconnect unit. With the NT relay released, this incoming seizure is prevented from entering the PBX trunk and instead operates relay CDH (ground through a contact of the ST relay, paths C1, C2, NT1 break through the CDH coil winding to the negative of battery B1). The operation of CDH relay closes contact CDH 11 to provide a holding circuit via the ground being supplied through the ST relay contact.

The operation of the CDH relay also provides immediate answer supervision by closure of leads CG and CS of the interconnect unit through CDH 7 make contact.

As long as the calling central office party is still on the line, the COS 1 and COS 2 leads remain closed thus maintaining the holding path for the CDH relay.

The operation of the CDH relay switches the transmission path (CT, CR) through the make contacts of CDH 8 and CDH 10, which extend the transmission path to the voice amplifier 25 at terminals A and C and through terminals E and H through back contacts OK 9 and OK 11 to terminals A and B of the touch calling receiver 15. The CDH trunk line is now coupled through the remote access unit to the touch calling receiver 15 and the facility is capabable of receiving and detecting the succeeding three digit enable code with the absence of dial tone.

The enable code is set on three multi-point switches, such as thumb-wheel switches, which are located at the bottom right hand of FIG. 2. and designated ES1, ES2 and ES3. These may be set individually to any digit between zero and 9 at the will of the custodian of the remote control unit.

Returning now to the description of the processing of the enable code, the calling subscriber keys the three digits. The first digit (in-band touch calling tone) arrives at leads CT and CR from the trunk and will pass through the voice frequency amplifier, contacts OK 9 and OK 11 to terminals A and B and forward to the detector circuit of the touch calling receiver. The touch calling receiver earlier specified is designed to provide an output at the end of the "buttons-up" portion of the tone. When the tone stops, a controlled output is given, and is coded over the PAB, PC, PD and PE leads in accordance with the digits detected, thereby operating the respective PAB . . . PE relays.

Table 1 shows the coded relay operation format for the illustrated embodiment.

TABLE 1

| DIGIT KEYED | OPERATED RELAYS | | | |
|---|---|---|---|---|
| 1 | PAB | | | |
| 2 | | PC | | |
| 3 | PAB | PC | PD | |
| 4 | | PC | PD | |
| 5 | PAB | | PD | |
| 6 | | | | PE |
| 7 | PAB | | | PE |
| 8 | | PC | | PE |
| 9 | PAB | PC | PD | PE |
| 10 | | PC | PD | PE |

As indicated in Table 1, the receiver output consists essentially of controlled ground marks on leads PAB . . . PE to operate the proper relay counting circuit. At the same time, and as a function of the touch calling receiver, ground is also applied to terminal C.

The code relays PAB . . . PC establish a counting tree on which the control ground from terminal C is existent (terminal C through DP4 and NT4 break to PCO contact). The coded relay format permits the control ground to be applied to the respective terminals 31–40 of the terminal strip associated with the thumb-wheel switches. The second digit of the terminal strip is the specific digit of the output of the relay tree. For example, terminal 31 means digit 1; terminal 37 means digit 7; terminal 32 means digit 2, etc.

Relays PAB . . . PE are momentarily operated by the output of the touch calling receiver and in turn momentarily lock through their own make contacts. For example, with respect to relay PAB, the path is contact PAB 11, FA 4 break through CDH 9 make to ground. This type of locking path prevents the caller from keying different digits or experimenting for the correct enable code combination. If the first digit received is not recognized by the operation of relays F and FA, then F11 and F4 break contacts will keep the coding relays PAB . . . PE operated thus locking out any subsequent digit attempts.

No indication of the validity of a digit is given to the calling party. The connection is maintained in a silent state. This means there is no way the calling party can detect whether the digits being keyed are correct except by keying the correct three digits of the enable code in succession and thus obtaining and hearing a PABX dial tone.

As earlier stated, if the correct first digit is dialed, then F relay will operate via the control ground from terminal C to the respective coding tree and first enable switch ES1. By the operation of the F relay, the FA relay operates through F8 make contact, CDH 9 make contact and ground. FA relay memorizes that the first digit was received and remains operated.

It should be borne in mind that the grounds to the PAB . . . PE relays coming from the touch calling receiver are momentary. They exist for about 60 milliseconds and then are absent. Consequently, if the first digit is correct, then F relay operates and by the operation of F relay FA relay also operates. The operation of FA relay also releases the holding path of F relay by contact FA 0 break; therefore F relay must release. The F relay is of a slow or delayed release type.

In effect PAB . . . PE relays are now reset as the operation of F relay transferred the locking path of PAB . . . PE to FA 4 break contact. Upon operation of FA relay and the slow release of F relay, the counting relays PAB . . . PE are released permitting them to be available for the next or second digit.

The second digit is decoded by the receiver and transmitted to relay PAB . . . PE in the same manner as described earlier. FA relay, however, is operated, which switches the counting tree through the second digit enable switch ES2 to terminal 42 of the switch terminal block through SA 2 break, FA 2 make, S relay coil to battery, thereby operating the S relay.

The S relay in turn permits an operating path for SA relay from battery B 1, through relay coil winding, S8 make through CDH 9 make to ground. SA relay operates and locks through its own SA 1 make, thus memorizing the second digit as being correctly received, allows PAB . . . PE to release, and prepares a path to receive the third and final enable code digit.

The third digit is received in a manner similar to the second described above except SA relay has prepared a path to monitor the third enable switch to terminal 41 of the switch terminal strip through SA 4 make contact and OK relay winding to battery. If the correct digit is received, OK relay operates.

As previously stated, upon completion of the third digit of the enable code the OK relay operates and will remain operated through its own contact OK 8, diode NT 2, CDH 9 make to ground. The OK relay switches the tip and ring transmission path through contacts OK 9 and OK 11 to terminals T and R at a PABX line circuit. Therefore, the transmission input to the touch calling receiver has been disabled and the transmission path terminated to the T and R terminals which are connected to an assigned PABX line circuit. A DC bridge is also placed across terminals T and R by OK 7 make contact (terminal T, OK 9 make, terminal 1 of retard coil 44, OK 7 make, terminal 4 of the retard coil, OK 11 make, to terminal R).

It will be understood that upon connection to the T and R terminals, any trunk or tie line that is accessible by a normal PABX station is accessible by the outside subscriber calling through the off network access circuit. PABX dial tone will be heard by the calling party and he may key the same route or number that is available to any other telephone within the PABX.

Upon completion of the call (hanging up of the telephone at the calling station) the release sequence is initiated under control of the incoming CDH unit. As earlier noted the CDH relay, which is the basic control relay for the unit, is held operated during the call by the S contact in the PABX trunk. The ST relay is held by the COS 1 and COS 2 leads, which are a permanent closure as the central office is connected. When the caller hangs up his telephone, there will be a release forward initiated by the telephone company central office, which in turn will release the incoming trunk to the PABX.

The CO supervision contact will eventually come open, thus releasing the S relay, thus releasing the CDH relay, and then all other operated relays release. There is a timed delay, which depends on the type of central office, but the timed delay is about 20 seconds. Accordingly following a nominal 20 seconds after the first party is disconnected, the entire system becomes free and may be seized by another caller by dialing in the proper trunk number.

The control function can also be adapted to a dial pulse PABX. The circuit additions for the latter are shown in FIG. 3.

In the preferred embodiment as earlier described, where the PABX is equipped with touch calling, the touch calling receiver is normally "borrowed" for the remote access function from a local originating register. With a dial pulse PABX provision is made to share a touch calling receiver between the remote control unit and a local originating register as shown in FIG. 3.

In the dial pulse arrangement the strap 46 (FIG. 2) in the path from terminal 41 to the OK relay coil is removed and connections are established from the terminals 47, 48 to terminals AX 5 and AX 2 respectively. Additional relays DP and AX are added to the system with terminal 24 connected to the terminal AX 5, AX to AX 1, AX3 to AX4, AXA to ground and AXM to diode pack Terminal 6.

With the modified system the operation through to the reception of the third digit of the enable code is as previously described. If the third digit received corresponds to the number set in the third enable switch ES 3, relay AX will operate via terminal 41, SA 4 make, terminal 48, terminal AX 2, AX 8 back contact, terminal AX 1, terminal AX, coil AX relay. AX relay is self-interrupting by AX8 break contact but is slow to release by the discharge of the capacitor switched across its coil by AX8 make. During this slow release time, AX 10 make contact serves to temporarily make busy all originating registers other than the predetermined originating register associated with the touch calling receiver. (Ground on AXA thru AX 10 make, AXM terminal to junction of isolation diode terminals 6–9 thru the diodes to the make busy terminals of the dial pulse originating registers). AX 7 make contact operates the DP and OK relays, which lock over OK 8 make, CDH 9 make to ground. The DP relay switches the leads of the touch calling receiver to the preassigned originating register (DP 0 thru DP 4 make). The T & R leads are cut through (by operation of OK 7, 9 and 11 make as earlier described).

The disconnect of the modified circuit for dial pulse PABX is as earlier described in connection with the preferred embodiment.

In the event it is desired to record either attempts to use the system or numbers of completed connections, or both this can be achieved by placing a meter 50 behind contact CDH 11 make, and another meter 51 in the ground path to the OK relay. The meters can be any simple type of step meters which are actuated in response to completion of the circuit. Obviously each time the CDH relay is energized by an incoming call, meter 50 will record this fact. Meter 51 will record satisfactory completions of the enable code. One may thus obtain information as to the number of attempts and completed calls during the period the system is in operation.

From the foregoing, it will be seen that this invention is one well adapted to attain all of the ends and objects herein above set forth together with other advantages which are obvious and which are inherent to the system.

It will be understood that certain features and subcombinations are of utility and may be employed without reference to other features and subcombinations.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a telephone communication system having a central switching exchange and subscriber stations equipped with telephone instruments for multi-frequency tone signaling representative of digits displayed on the instrument, the combination therewith of an automatic private branch exchange, a communication channel to said branch exchange from said central exchange, a tone signal receiver associated with said branch exchange and operable to translate tones keyed from said subscriber instruments to a plurality of output pulse patterns corresponding to and indicative of the discrete tones generated at said subscriber instruments, and control means connected with said channel and said receiver and operable upon reception of a preselected combination of output pulse patterns from said receiver to switch said channel into said branch exchange to enable route switching within the branch exchange under the control of the tone signals keyed at said subscriber instrument.

2. The combination as in claim 1, said control means including selector means permitting selective variation of the combination of pulse patterns on which said switching in said branch exchange takes place.

3. The combination as in claim 2, said selector means including manually operated selector switches having a plurality of positions representing digits.

4. The combination as in claim 1, said control means including detector means operable to sense and respond to pre-selected, sequentially related patterns of pulses from said receiver.

5. The combination as in claim 4, said detector means so arranged as to lock out and be nonresponsive to any pattern succeeding an incorrect pattern.

* * * * *